United States Patent
Ficara et al.

(10) Patent No.: US 12,513,524 B2
(45) Date of Patent: Dec. 30, 2025

(54) PREVENTING ABUSE OF MEDIA ACCESS CONTROL ADDRESSES BY ROGUE DEVICES

(71) Applicant: Cisco Technology, Inc., San Jose, CA (US)

(72) Inventors: Domenico Ficara, Essertines-sur-Yverdon (CH); Roberto Muccifora, Ropraz (CH); Robert Edgar Barton, Richmond (CA); Jerome Henry, Pittsboro, NC (US); Stephen Michael Orr, Wallkill, NY (US); Amine Choukir, Ecublens (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 843 days.

(21) Appl. No.: 17/674,304

(22) Filed: Feb. 17, 2022

(65) Prior Publication Data

US 2023/0262465 A1    Aug. 17, 2023

(51) Int. Cl.
  *H04W 12/122*     (2021.01)
(52) U.S. Cl.
  CPC .................. *H04W 12/122* (2021.01)
(58) Field of Classification Search
  CPC .. H04W 12/122; H04W 12/088; H04W 12/71
  See application file for complete search history.

(56) References Cited

U.S. PATENT DOCUMENTS

| 9,220,007 | B2 | 12/2015 | Remaker | |
| 10,666,427 | B1* | 5/2020 | Locketz | ................... H04L 67/34 |
| 2012/0213211 | A1* | 8/2012 | Remaker | ............ H04L 63/0421 |
| | | | | 370/338 |
| 2016/0269359 | A1 | 9/2016 | Adrangi et al. | |

(Continued)

FOREIGN PATENT DOCUMENTS

WO    2016077194 A1    5/2016

OTHER PUBLICATIONS

Amelia Andersdotter et al., "Wireless LANs", doc.: IEEE 802.11-19/588r2, Article19, May 13, 2019, 6 pages.

(Continued)

*Primary Examiner* — Mazda Sabouri
(74) *Attorney, Agent, or Firm* — Edell, Shapiro & Finnan, LLC (57) ABSTRACT

Methods are provided to determine validity of a MAC address. The methods involve obtaining a media access control (MAC) address validity message that indicates a plurality of valid MAC addresses in the wireless network using a fully-exploded format or a probabilistic data structure and determining whether a MAC address is valid based on the MAC address validity message. Other methods involve obtaining a query regarding a validity of a media access control (MAC) address, determining whether the MAC address is a value included in a data set of expected values of a probabilistic data structure. The data set represents a list of MAC addresses. The other methods involve determining whether the MAC address is valid in the (Continued)

wireless network based on determining whether the MAC address is the value included in the data set and providing a response indicating whether the MAC address is valid.

20 Claims, 7 Drawing Sheets

(56) References Cited

U.S. PATENT DOCUMENTS

| | | | |
|---|---|---|---|
| 2019/0166636 A1* | 5/2019 | Sahu | H04W 88/10 |
| 2019/0174295 A1 | 6/2019 | Seidman et al. | |
| 2019/0213349 A1* | 7/2019 | Luo | H04L 63/0227 |
| 2019/0357052 A1* | 11/2019 | Korrub | H04W 12/122 |
| 2019/0357308 A1* | 11/2019 | Kurian | H04W 72/0446 |
| 2020/0322423 A1 | 10/2020 | Sheth | |
| 2021/0168115 A1 | 6/2021 | de la Oliva et al. | |
| 2021/0311918 A1* | 10/2021 | Cheng | G06F 11/3636 |
| 2021/0360465 A1 | 11/2021 | Henry et al. | |
| 2023/0007487 A1* | 1/2023 | Jain | H04W 12/122 |
| 2025/0024263 A1* | 1/2025 | Sedin | H04W 12/71 |

OTHER PUBLICATIONS

Mohammad Alaggan et al., "Privacy-preserving Wi-Fi Analytics", DOI 10.1515/popets-2018-0010, Proceedings on Privacy Enhancing Technologies; Accepted Dec. 16, 2018 (2), pp. 4-26.
Carol Ansley, "Randomized and Changing Mac Address (RCM) Study Group (SG)", IEEE P802.11, last updated Jan. 29, 2021, 2 pages; https://www.ieee802.org/11/Reports/rcmtig_update.htm.

* cited by examiner

PREVENTING ABUSE OF MEDIA ACCESS CONTROL ADDRESSES BY ROGUE DEVICES

TECHNICAL FIELD

The present disclosure generally relates to data and communication networks.

BACKGROUND

Randomizing and changing Media Access Control (MAC) addresses (RCM) in various wireless devices is not uncommon as a privacy enhancement measure. With RCM clients, any sort of MAC-based authentication or information caching is at risk. For example, rogue clients may simply monitor radio frequency (RF) spectrum and identify if any authenticated client has changed their MAC address, keep track of past valid MAC addresses, and try reusing them. Similarly, access points (APs) MAC address rotation may result in some clients connecting to an old AP MAC address (known as basic service set identifier (BSSID)) that is obtained by a rogue or ill-intentioned device.

DESCRIPTION OF EXAMPLE EMBODIMENTS

Overview

A mechanism is presented herein to exchange MAC address validity messages indicative of one or more valid MAC addresses and to determine validity of a MAC address.

In one form, a network device, in a wireless network, obtains a MAC address validity message that indicates a plurality of valid MAC addresses in the wireless network using a fully-exploded format or a probabilistic data structure, and determines whether a MAC address is valid based on the MAC address validity message.

In another form, a network device, in a wireless network, obtains a query regarding validity of a MAC address and determines whether the MAC address is a value included in a data set of expected values of a probabilistic data structure. The data set represents a list of MAC addresses. The network device further determines whether the MAC address is valid in the wireless network based on determining whether the MAC address is the value included in the data set. The network device further provides a response indicating whether the MAC address is valid.

Example Embodiments

In one or more example embodiments, techniques are provided to track MAC address rotations and exchange MAC address validity messages.

In the techniques presented herein, one or more network devices track past-rotated MAC addresses because a previously-used MAC address can be recycled by a rogue network device. The past-rotated MAC addresses may be obtained from cooperating client devices or via various other techniques. When a MAC address matches one of the past valid MAC addresses, a rogue device or an impersonating device is detected and an alarm is raised. When the alarm is raised, other network devices are configured not to communicate with the rogue device.

In the techniques presented herein, MAC address validity messaging is provided to determine one or more valid MAC addresses. The MAC address validity messaging may be in a push or pull mode, as further detailed below. The MAC address validity messaging may be broadcasted to multiple devices and/or across various networks.

In general, MAC address validity may be for a single-use for a given network or per epoch. An epoch is a period of time between two events where the MAC address membership set for a particular wireless access network associated with a service set identifier (SSID) is stable and does not change. MAC address validity per epoch typically implies that a given MAC address cannot be reused for N consecutive epochs, where N is an integer equal to or greater than 1.

The MAC address validity messaging conveys or indicates one or more of: (1) valid MAC addresses of one or more devices in a network in a given epoch, (2) expired MAC addresses that have been used in the past, and (3) future MAC addresses such as MAC addresses available for use by a device in a next time interval or epoch. The MAC addresses may be provided using a fully-exploded format or using a probabilistic data structure such as a bloom filter (BF) as further detailed below.

Figure 1:
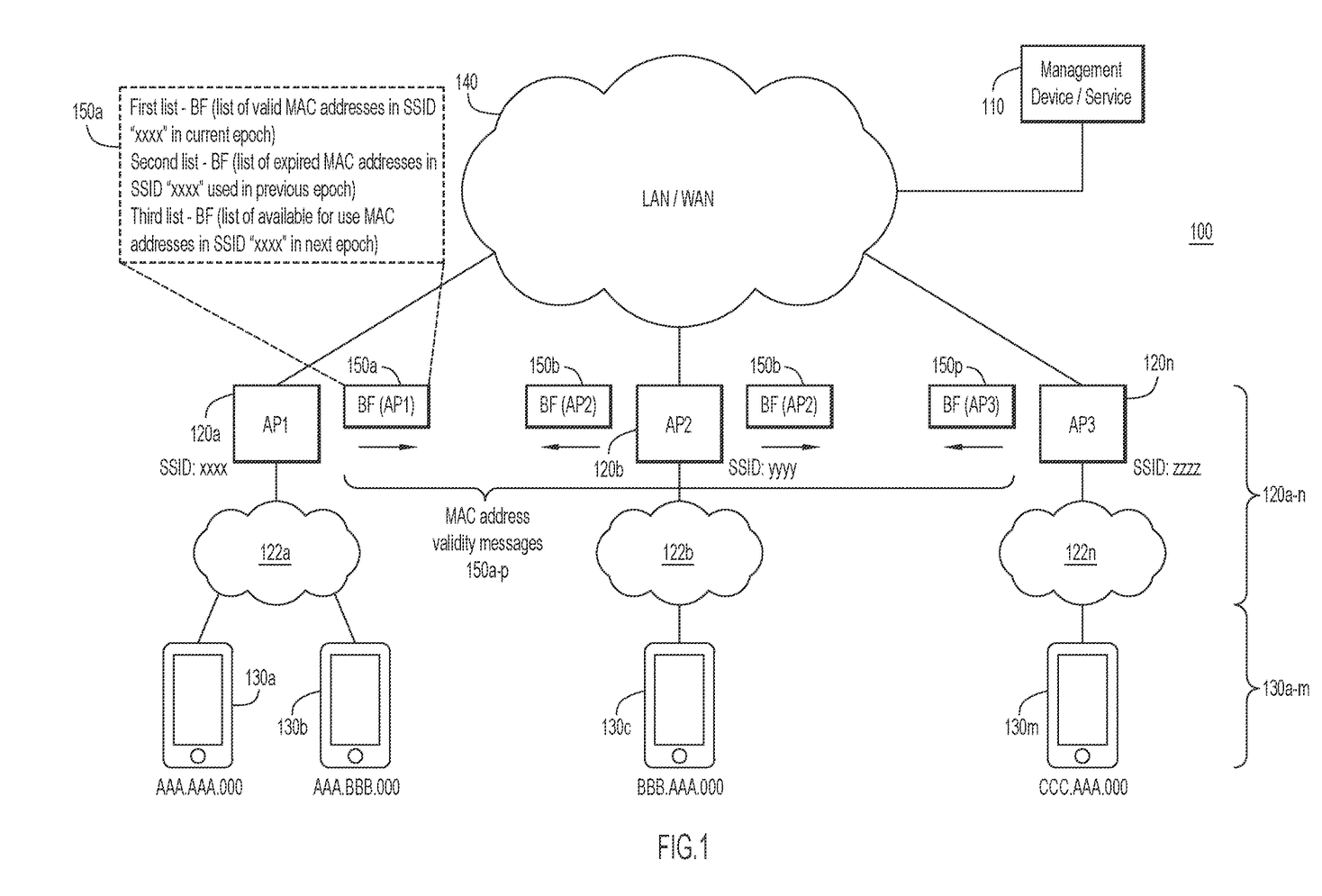
FIG. 1 is a block diagram illustrating a system configured to exchange MAC address validity messages, according to an example embodiment.

FIG. 1 is a block diagram illustrating a system 100 configured to exchange MAC address validity messages, according to an example embodiment. The system 100 includes a management device/service 110 connected to a plurality of access points (APs) 120a-n via a network such as a local area network (LAN) or a wide area network (WAN) 140, and a plurality of client devices 130a-m connected to various APs 120a-n via various wireless access networks 122a-n.

The notation "a-n" denotes that a number is not limited, can vary widely, and depends on a particular use case scenario, and need not be the same, in number, for the client devices and APs. Moreover, this is only an example of the system 100, and the number and types of entities may vary based on a particular deployment and use case scenario, such as the type of service being provided and network structures. For example, while the system 100 includes APs 120a-n, other network devices that are assigned MAC addresses may be present in the system 100. The network devices may include, but are not limited to switches, virtual routers, leaf nodes, spine nodes, etc.

In various example embodiments, the entities of the system 100 (client devices 130*a-m*, APs 120*a-n*, and management device/service 110) may each include a network interface, at least one processor, and a memory. Each entity may be an apparatus or any programmable electronic device capable of executing computer readable program instructions. The network interface may include one or more network interface cards (having one or more ports) that enable components of the entity to send and receive packets or data over the network(s), such as LAN/WAN 140, and/or wireless access networks 122*a-n*. Each entity may include internal and external hardware components such as those depicted and described in further detail in FIG. 6 or 7. In one example, at least some of these entities may be embodied as virtual devices with functionality distributed over a number of hardware devices, such as virtual APs, switches, routers, etc.

The client devices 130*a-m* may include any suitable device configured to initiate a flow in the system 100, such as data source device and/or data sink device. For example, the client devices 130*a-m* may include a computer, an enterprise device, an appliance, an Internet of Things (IoT) device, a Personal Digital Assistant (PDA), a laptop or electronic notebook, a smartphone, a tablet, and/or any other device and/or combination of devices, components, elements, and/or objects capable of initiating voice, audio, video, media, or data exchanges within the system 100. The client devices 130*a-m* may also include any suitable interface to a human user such as a microphone, a display, a keyboard, or other terminal equipment. The client devices 130*a-m* may be configured with appropriate hardware (e.g., processor(s), memory element(s), antennas and/or antenna arrays, baseband processors (modems), and/or the like such as those depicted and described in further detail in FIG. 7), software, logic, and/or the like to facilitate respective Over-the-Air (OTA) interfaces for accessing/connecting to APs 120*a-n* and sending or receiving packets.

In the system 100, first client device 130*a* and second client device 130*b* are devices connected to (have established an association with) first AP 120*a* via first wireless network 122*a*, the third client device 130*c* is connected to second AP 120*b* via second wireless network 122*b* (another wireless access network), and fourth client device 130*m* is connected to third AP 120*n* via third wireless network 122*n* (yet another wireless access network).

The client devices 130*a-m* and the APs 120*a-n* may represent a wireless infrastructure that provides Wireless Local Area Network (WLAN) coverage for a specific geographic area/location. For example, wireless infrastructure may serve an airport, a shopping mall, train station, venue, etc. The client devices 130*a-m* and the APs 120*a-n* may use various wireless access network protocols, such as the WiFi® wireless technology, to send and receive various packets.

The APs 120*a-n* may be WLAN APs configured with appropriate hardware (e.g., processor(s), memory element(s), antennas and/or antenna arrays, baseband processors (modems), and/or the like), software, logic, and/or the like to provide OTA coverage for a WLAN access network (e.g., Wi-Fi®). In various example embodiments, the APs 120*a-n* may be implemented as Wi-Fi access points (APs) and/or the like. The APs 120*a-n* may be configured with appropriate hardware (e.g., processor(s), memory element(s), antennas and/or antenna arrays, baseband processors (modems), and/ or the like such as those depicted and described in further detail in FIG. 6), software, logic, and/or the like to facilitate respective OTA interfaces for accessing/connecting to client devices 130*a-m* (to send and receive packets) and for communicating with management device/service 110 (to send and receive packets). The APs 120*a-n* may be managed or controlled by the management device/service 110 such as a wireless LAN controller (WLC). The APs 120*a-n* are connected to the management device/service 110 via the LAN/WAN 140 to send and receive data or packets.

The management device/service 110 may be a management device(s) or software process associated with wireless infrastructure. The management device/service 110 may provide or be responsible for WLAN functions such as WLAN-based access authentication services, authorization services, intrusion prevention, Radio Frequency (RF) management, and/or the like to facilitate client devices 130*a-m* connectivity via APs 120*a-n*. In one form, the management device/service 110 may be a software process running on one or more servers in a cloud (on any server in a datacenter or at any location with Internet connectivity). The management device/service 110 is configured with appropriate hardware (e.g., processor(s), memory element(s), and/or the like such as those depicted and described in further detail in FIG. 7), software, logic, and/or the like.

APs 120*a-n* manage MAC addresses of their respective client devices. That is, first AP 120*a* obtains first MAC address (depicted as "AAA.AAA.000") of first client device 130*a* and second MAC address (depicted as "AAA.BBB.000") of second client device 130*b*. Second AP 120*b* obtains third MAC address (depicted as "BBB.AAA.000") of third client device 130*c* and third AP 120*n* obtains fourth MAC address (depicted as "CCC.AAA.000") of fourth client device 130*m*. That is, each of the APs 120*a-n* maintain a list of valid MAC addresses associated with the respective AP (SSID). In the system 100, first AP 120*a* is assigned first SSID "xxxx", second AP 120*b* is assigned second SSID "yyyy", and third AP 120*n* is assigned third SSID "zzzz". In the system 100, first AP 120*a*, second AP 120*b*, and third AP 120*n* are neighboring network devices.

Further, each of the APs 120*a-n* may perform MAC address rotation, at a preset time interval (each epoch), for each client device associated with it (respective SSID). Instead of the preset time interval or in addition to the preset time interval, MAC address rotation may be performed at a request of a respective client device and/or at the direction of the management device/service 110. MAC address rotation involves assigning one or more new MAC addresses to the respective device(s).

Figure 2:
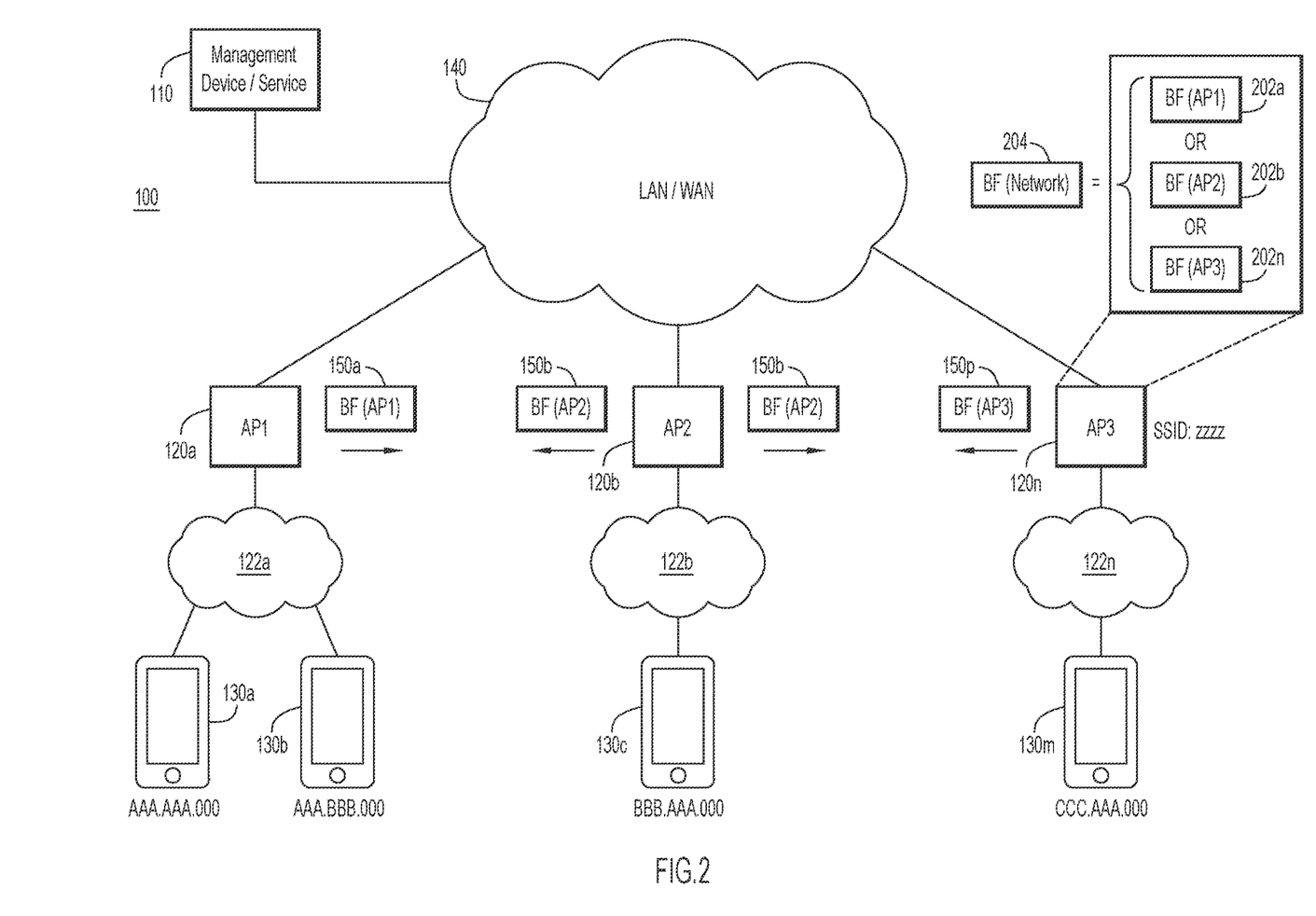
FIG. 2 is a block diagram illustrating a system configured to obtain a global MAC address list from various MAC address lists in a bloom filter format, according to an example embodiment.

For example, first AP 120*a* may perform MAC address rotation, at a preset time, for the devices in first wireless network 122*a* such as first client device 130*a* and second client device 130*b*, assigning new MAC addresses such as "AAA.AAA.111" to first client device 130*a* and "AAA.BBB.1111" to second client device 130*b*. In response to performing the MAC address rotation, the first AP 120*a* generates first MAC address validity message 150*a* that indicates the plurality of new MAC addresses (first new MAC address for first client device 130*a* "AAA.AAA.111" and second new MAC address for second client device 130*b* "AAA.BBB.111"), as also depicted in FIG. 2. The first MAC address validity message 150*a* may further indicate the plurality of MAC addresses used prior to performing the MAC address rotation (previous or expired MAC addresses such as "AAA.AAA.000" of first client device 130*a* and "AAA.BBB.0000" of second client device 130*b*).

The APs 120a-n generate MAC address validity messages 150a-p for various other reasons and in response to various other events. For example, one of the APs 120a-n may generate a MAC address validity message at the request of the client devices 130a-m, at the request of the management device/service 110, at the request of another AP, at a predetermined time, or at a preset time interval (e.g., each epoch).

MAC address validity messages 150a-p may indicate one or more of: (1) a plurality of valid MAC addresses in a respective wireless access network (e.g., a first list in the first MAC address validity message 150a), (2) a plurality of expired MAC addresses in the respective wireless access network (for a previous epoch or N number of previous epochs) such as a second list in the first MAC address validity message 150a, and (3) a plurality of new MAC addresses (available for use by a network device in a next time interval or next epoch) such as a third list in the first MAC address validity message 150a. As a result, for each SSID assigned to a respective AP, one or more lists of MAC addresses are provided to one or more devices in its respective wireless network.

The MAC address validity messages 150a-p may be in a fully-exploded format. This, however, may result in a large size messages which take longer to transmit and process. When a list or lists of MAC addresses are long, succinct but reliable representation of MAC addresses may be preferred. In one example embodiment, the MAC address validity message may indicate a plurality of MAC addresses in a probabilistic data structure, such as, for example, a bloom filter (BF). For example, the first, second and third lists in the first MAC address validity message 150a are provided in BF format. Similarly, one or more lists of MAC addresses in the second MAC address validity message 150b and the third MAC address validity message 150p are in BF format.

A BF may be used to determine if an element is part of a data set. In this case, the data set is a set of expected MAC address values. In this model, BF uses K hash function applied to the input (MAC address) and then set a one in the corresponding bit of a bitmap. Thus, if the BF query returns a negative result for a MAC address, then it will become obvious that it is an imposter. The hash values are preprogrammed into, or otherwise stored in advance in, the APs 120a-n (including wireless mesh APs that do not have a wired connection). Thus, at a certain time, the management device/service 110 only needs to instruct one or more of the APs 120a-n to begin using another MAC address value in a BF sequence, without explicitly instructing the respective AP as to which particular MAC address value to use. In this way, only trusted infrastructure devices use a correct MAC address/value. Imposters are unable to guess a true MAC address. If an infrastructure device attempts to use a MAC address that is not corroborated by the BF, it is considered/declared a rogue device.

While a BF does not permit a false negative, false positive matches are possible. In one or more example embodiments, any potential false-positive related to a BF may be reduced and it will not affect the value of the message. That is, false-positive probability can be tuned at will or preprogrammed or defined as needed. For example, false positives can be reduced by increasing the size of the BF and adapting the number of hash functions k. The minimum false positive probability is given by a formula:

$$k = m/n \ln(2),$$

where k is the number of hash functions, m is the number of entries (MAC addresses), and n is the number of bits in the bitmap. Consequently, by increasing the value for n, k value is adopted accordingly, decreasing false positives. In other words, a false-positive can be made negligible for the usual maximum number of client devices 130a-m per each of the APs 120a-n or per-SSID. For example, if a false positive occurs on a BF, a respective client device generates another MAC address or a respective AP proposes a different MAC address.

As another example, if a false-positive occurs, an observer client device or AP can easily determine the validity of that MAC address by performing an active query on the MAC address. That is, an active query is made to the AP that generated that BF, and hence knows all its clients. This can be performed at each query. Since a positive match is a rare event, it is a low cost operation. Alternatively, when the querying entity (AP or client device) has some suspect on the MAC address, for example, based on input from Wireless Intrusion Prevention System (WIPS) systems, it can perform the active query, as explained in further detail below.

In the system 100, first AP 120a generates the first MAC address validity message 150a that indicates a plurality of valid MAC addresses in first wireless network 122a (MAC addresses of first client device 130a and second client device 130b). The first list is in a BF format and includes a data set of expected values indicative of a plurality of MAC addresses that are associated with SSID "xxxx" of the first AP 120a. Second AP 120b generates the second MAC address validity message 150b that is indicative of a valid MAC address of third client device 130c and third AP 120n generates a third MAC address validity message 150p that indicates valid MAC address of fourth client device 130m. These MAC address validity messages 150a-p may be delivered in a push model, where each of the APs 150a-p broadcasts, for its respective SSID, a list of valid MAC addresses in a fully-exploded format or in a probabilistic data structure, such as a BF.

Specifically, first AP 120a broadcasts first MAC address validity message 150a to second AP 120b and third AP 120n (neighboring APs) and optionally, to each of the client devices in first wireless network 122a (first client device 130a and second client device 130b) and to the management device/service 110. Second AP 120b broadcasts second MAC address validity message 150b to first AP 120a and third AP 120n and optionally, to each device in second wireless network 122b and to the management device/service 110. Similarly, third AP 120n broadcasts the third MAC address validity message 150p to first AP 120a and second AP 120b (neighboring APs) and optionally, to each device in third wireless network 122n and to the management device/service 110.

APs 120a-n obtain the MAC address validity messages 150a-p (from neighboring APs) and determine whether a particular MAC address is valid based on these MAC address validity messages 150a-p. Using these MAC address validity messages 150a-p, the APs 120a-n and/or the client devices 130a-m can detect a rogue or impersonator device. Further, the APs 120a-n and/or the client devices 130a-m can determine whether a desired next MAC address is overlapping or causing collisions with any of the other MAC addresses or previous MAC addresses (e.g., MAC addresses used prior to performing the MAC address rotation) in the system 100 or whether it is available for use.

With continued reference to FIG. 1, FIG. 2 is a block diagram illustrating the system 100 configured to obtain a global MAC address list from various MAC address lists in BF format, according to an example embodiment. As explained above, MAC address validity messages 150a-p are indicative of a first list of one or more valid MAC addresses in a respective wireless network, a second list of one or more expired MAC addresses in the respective wireless network (e.g., MAC addresses used prior to performing the MAC address rotation), and/or a third list of one or more available for future use MAC addresses in the respective wireless network. Using the MAC address validity messages 150a-p, these lists are shared across multiple network entities, such as APs 120a-n.

For example, third AP 120n generates a BF of valid MAC addresses in the third wireless network 122n (associated with third SSID "zzzz" of the AP 120n), referred as BF(AP3) 202n. Further, third AP 120n obtains, from the first AP 120a, a first MAC address validity message 150a that indicates a first list of valid MAC addresses in a first wireless network 122a, referred as BF(AP1) 202a and a second MAC address validity message 150b, from the second AP 120b, that indicates a second list of valid MAC addresses in a second wireless network 122b, referred as BF(AP2) 202b. Since each AP shares a BF of MAC addresses it handles (in its respective wireless access network) and with other APs, eventually a global view of MAC addresses used by co-located APs (for instance for flex deployments) may be obtained, such as BF (network) 204.

If the BF format is used for lists of valid MAC addresses, there are a few properties of a BF that are useful to determining the validity of a MAC address, preventing MAC address abuse by a rogue device, and avoiding MAC address conflicts/overlaps.

First, MAC address privacy is enhanced because the actual MAC addresses are not being transmitted. That is, privacy is preserved because a network device may query for a presence of a particular element or value within a data set, but all MAC addresses are not listed.

Second, BF(A+B)=BF(A) OR BF(B). In other words, the BF of a set union is the bitwise "OR" their individual BFs.

Third, BF(A & B)=BF(A) AND BF(B). In other words, the BF of set intersection is the bitwise "AND" of their individual BFs. BF (A & B) means that an AP can determine if there is any overlap of MAC addresses for its client devices with another AP/network. For example, third AP 120n may use BF(AP1) 202a & BF(AP2) 202b and BF(AP3) 202n to determine if there is an overlap in any of the MAC addresses using in the wireless networks 122a-n.

These second and third bitwise properties are also useful because when each AP computes the BF of all MAC addresses it handles and shares it with other APs, eventually a global view is obtained on all MAC addresses used by co-located APs, illustrated as BF (network) 204. For example, an AP may use BF(A+B) to determine whether a particular MAC address is valid in BF (network) 204.

Figure 3A:
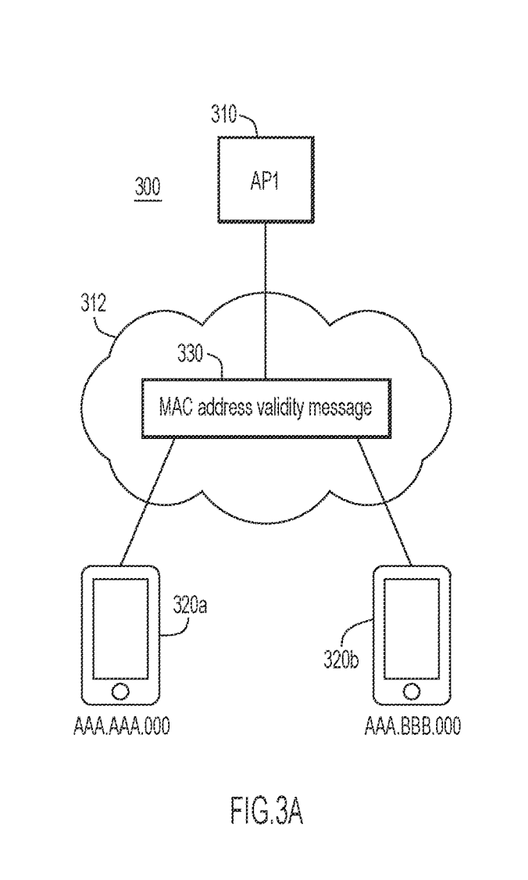
FIGS. 3A-3C are diagrams illustrating operations of a system configured to determine the validity of a MAC address, according to various example embodiments.
Figure 3B:
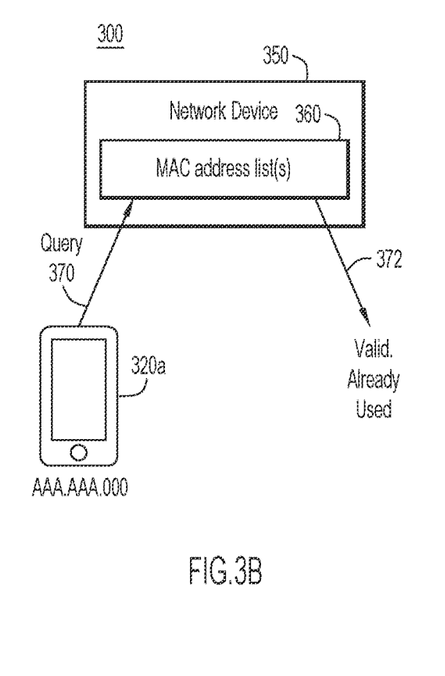
Figure 3C:
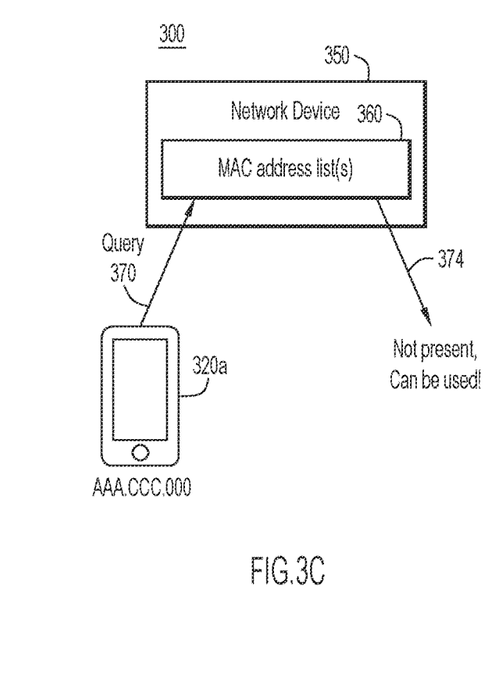

With continued reference to FIGS. 1 and 2, reference is now made to FIGS. 3A-3C, which illustrate a system 300 in which validity of a MAC address is determined, according to various example embodiments. In FIG. 3A, the system 300 includes an AP 310 such as one of the APs 120a-n and two client devices 320a and 320b such as some of the client devices 130a-m. The two client devices 320a and 320b are associated with the AP 310 via a wireless network 312. In FIGS. 3B and 3C, the system 300 includes a network device 350 such as one of the client devices 130a-m, one of the APs 120a-n, the management device/service 110, or another network entity.

In FIG. 3A, a validity of a MAC address is determined based on a MAC address validity message 330, according to an example embodiment. The AP 310 broadcasts MAC address validity message 330 to the two client devices 320a and 320b. In one example embodiment, the AP 310 broadcasts the MAC address validity message 330 at an epoch-change i.e., when a new client device joins, when a client device leaves the network, and/or at RCM events.

The MAC address validity message 330 includes one or more MAC address lists, such as a first MAC address list that indicates a plurality of valid MAC addresses in the wireless network 312 using a fully-exploded format or a probabilistic data structure such as a BF, a second MAC address list that indicates a plurality of expired MAC addresses in the wireless network 312 using the fully-exploded format or the probabilistic data structure such as a BF, and/or third MAC address list that indicates a plurality of MAC addresses in the wireless network 312 that are available for use. By encoding the MAC address list(s) using a BF, privacy of MAC addresses is maintained.

The client devices 320a and 320b determine whether a particular MAC address is valid based on the MAC address validity message 330. For example, if the MAC address is determined to be valid, the respective client device communicates or establishes a communication session with a network device associated with the valid MAC address. As another example, if the MAC address is determined to be invalid (not present in the MAC address list(s)), the respective network device may change its MAC address to the MAC address determined to be not valid (or not present) in the wireless network 312.

When the list of MAC addresses is provided in a probabilistic data structure, such as a BF, a respective client device of the two client devices 320a and 320b determines whether the MAC address is valid by determining whether the MAC address is in a data set of expected values of the BF. As noted above, the expected values in the data set are generated based on a hash value and the expected values are indicative of the plurality of MAC addresses that are associated with the SSID of the wireless network 312 (the AP 310).

In one example embodiment, the MAC address validity message 330 includes a "desired next MAC" list (available for use MAC addresses). The list is encoded as the BF to maintain privacy. For example, in response to the two client devices 320a and 320b indicating that their MAC addresses are to be rotated, the MAC address validity message 330 is generated in which the AP 310 encodes the MAC addresses to be used (available for use) for the two client devices 320a and 320b. While in epoch x, the two client devices 320a and 320b encode their next desired MAC address for epoch x+1. This example is similar to a transactional model for allocation of rotated MAC addresses.

In another example embodiment, instead of AP 310, the management device/service 110 may instruct APs to perform a MAC address rotation, at a preset time interval, in which a plurality of new MAC addresses are assigned to a plurality of APs. The new MAC addresses are generated using a hash value. The management device/service 110 then generates the MAC address validity message that indicates the plurality of new MAC addresses of various APs in response to performing the MAC address rotation. The MAC address validity message uses the probabilistic data structure, such as a BF, that includes a data set indicative of the plurality of new MAC addresses. The MAC address validity message may further indicate a plurality of MAC addresses in BF format prior to performing the MAC address rotation (expired MAC addresses). The management device/service 110 may further broadcast the MAC address validity message to neighboring management devices.

In FIGS. 3B and 3B, the system 300 determines the validity of a MAC address using a pull model approach, according to various example embodiments. In FIGS. 3B and 3C, the network device 350 stores MAC address list(s) 360. The network device 350 may be any network entity such as an AP or a controller, etc.

At 370, the client device 320a queries the network device 350 as to whether a particular MAC address is available for use. For example, when the client device 320a intends to rotate its MAC address to a new MAC address, the network device 350 determines whether the MAC address is available for use based on the MAC address list(s) 360 stored therein. The MAC address list(s) include one or more of: valid MAC addresses currently in use, expired MAC addresses for x prior time intervals (epochs), where x is an integer equal to or greater than 1, and/or MAC addresses available for use.

Based on the MAC address list(s) 360, the network device 350 determines that the MAC address is already in use (is a valid MAC address). At 372, the network device 350 responds to client device 320a indicating that the MAC address is valid. On the other hand, if the MAC address is not found, at 374 (FIG. 3C), the network device 350 responds to client device 320a indicating that the MAC address is not valid (not present). This means that the client device 320a can use the MAC address.

In one example embodiment, the network device 350 may further interrogate neighboring APs about the validity of a given MAC address in a specified SSID. For example, Access Network Query Protocol (ANQP) messaging may be used to validate a MAC address across multiple SSIDs or wireless networks. The network device 350 then determines the validity of the MAC address based on responses from the neighboring APs. Therefore, a unique MAC address is assigned to the client device 320a that does not overlap with a MAC address used in any neighboring wireless access networks. The messaging does not impact client privacy as it does not leak information about the MAC sequence progression of the client device 320a because the mechanism simply interrogates other network devices about MAC network-membership/validity in a given time instant. The BF may also be signed by the AP to avoid potential forgery by malicious users of the network.

In one example embodiment, a similar mechanism is implemented for rotating MAC addresses of the APs. The rotation of MAC addresses of the APs may be managed by the management device/service 110 or by simply exchanging MAC address validity messages with other APs to build a global list, such as the BF (network) 204 of FIG. 2. Thereafter, each of the APs may determine whether the MAC address is valid in a first wireless network or a second wireless network based on the BF of the first wireless network and the BF of the second wireless network, thus detecting a rogue device and/or a MAC address that is available for use. Each of the APs may further determine if the MAC address is valid in the first wireless network and the second wireless network based on these BF lists, thus detecting conflicts and/or overlaps in the two wireless networks.

In one example embodiment, a network entity such as a client device, an AP, or a management device/service may generate the MAC address using a pseudo-random number generator (PRNG). For example, if the client device 320a generates the MAC address using a secure PRNG, the client device 320a may share the sequence (in a form of an equation or a seed value) with the network including the network device 350 and/or other client devices in the network. In this case, the next-epochs future MAC addresses (within a certain timespan) can be protected as invalid-in-this-epoch.

In yet another example embodiment, a network entity such as the client device 320a, the network device 350 or a controller, does not proactively share any validity membership set, but rather intervenes when one of the network entities adopts an invalid MAC address within the SSID. For example, using a secure association (SA) query, the network entity informs the respective device that the new MAC address is an unassociated and/or invalid MAC address. In another example, instead of using the SA, the network entity may inform the respective device that the new MAC address is invalid using an ANQP extension.

In one or more example embodiments, the APs 120a-n may use blockchain techniques for various MAC addresses in the respective wireless access network or across wireless networks. For example, a respective AP uses a blockchain to share a list of events occurring in the network, such as a client device joining the network event and/or a client device leaving the network event. Since no direct information regarding MAC sequence is shared, privacy of network entities such as client devices 130a-m and/or APs 120a-n is maintained. Since blockchain messaging may be large in size, a trimmed history of events may be provided in the blockchain messaging.

In another form, one or more example embodiments may share single-use AP-vouched MAC addresses. In this form, a next MAC address is computed as the next number by a cryptographically secure pseudo-random-generator. APs and client devices share common information (such as a seed value), which allows the network entities to compute the next MAC address securely. In one example, the AP provides, securely and at regular time intervals, the seeding parameters to all client devices associated with its SSID. This allows each client device to compute a new MAC address securely for the next time interval (epoch). Client devices may add their salt to the computation or they can adhere to a shared computation. In this case, the AP is handling the "epochs" and requesting that all of the associated client devices rotate their MAC address at each new epoch. This improves privacy for the client devices because there are multiple MAC addresses disappearing and multiple new MAC addresses appearing in one instant. Also, this allows the AP to control the next random MAC addresses that are available for use, avoiding collisions and reuse of expired MAC addresses. In one example, the PRGN is applied as a secure multi-party computation.

Techniques herein provide a mechanism to detect when an attacker attempts to reuse an expired MAC address, thus preventing a rogue device from using a MAC address that may still be considered valid by some network entities. Additionally, techniques provide a mechanism for sharing a list of valid MAC addresses using MAC address validity messaging. Based on this list, a network entity may determine whether a MAC address is valid. Further, techniques provide a mechanism for sharing a list of MAC addresses available for future use such that a network entity encodes a new MAC address in a next epoch based on this list.

Figure 4:
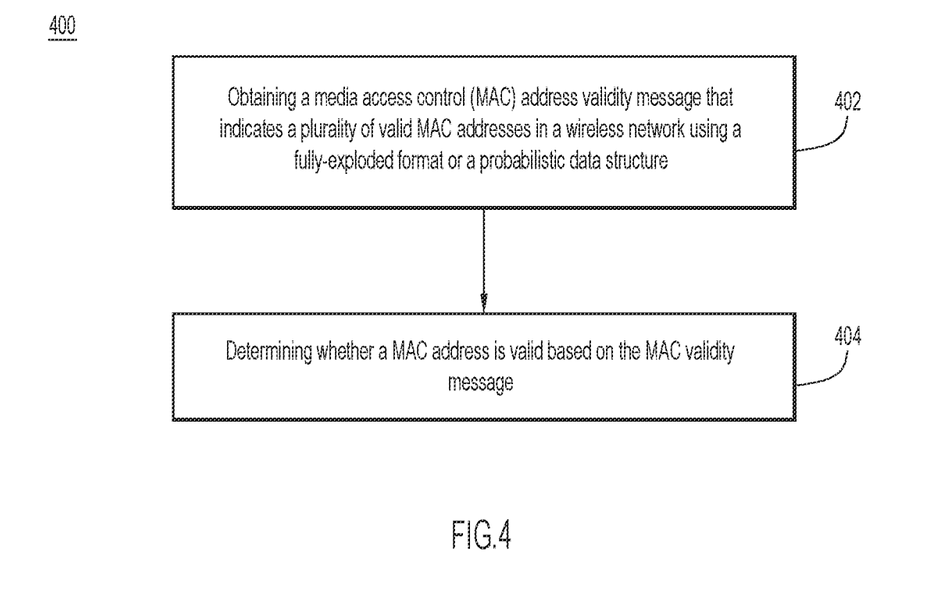
FIG. 4 is a flow diagram illustrating a method of determining whether a MAC address is valid, according to an example embodiment.

FIG. 4 is a flowchart illustrating a method of 400 of determining validity of MAC address, according to an example embodiment. The method 400 may be performed by a client device, such as any of the client devices 130a-m of FIGS. 1 and 2 or the client devices 320a and 320b of FIGS. 3A-C, network devices such as the APs 120a-n of FIGS. 1 and 2, the AP 310 of FIG. 3A, or the network device 350 of FIGS. 3B and 3C, and/or a management device such as the management device/service 110 of FIGS. 1 and 2.

The method 400 involves, at 402, obtaining a media access control (MAC) address validity message that indicates a plurality of valid MAC addresses in a wireless network using a fully-exploded format or a probabilistic data structure. The method 400 further involves, at 404, determining whether a MAC address is valid based on the MAC address validity message.

In one instance, the method 400 may further involve changing an assigned MAC address of a network device to the MAC address based on determining, at 404, that the MAC address is not valid.

In one or more example embodiments, the MAC address validity message may indicate the plurality of valid MAC addresses in the probabilistic data structure. The operation 404 of determining whether the MAC address is valid may include determining whether the MAC address is in a data set of expected values of the probabilistic data structure.

In one form, the expected values in the data set may be generated based on a hash value and the expected values may be indicative of the plurality of valid MAC addresses that are associated with an SSID of the wireless network.

In one or more example embodiments, the MAC address validity message may be a first MAC address validity message that includes a first bloom filter indicating a first set of valid MAC addresses in a first wireless network. The method 400 may further involve obtaining a second MAC address validity message that includes a second bloom filter indicating a second set of valid MAC addresses in a second wireless network. The method 400 may further involve determining one or more of whether the MAC address is valid in the first wireless network or the second wireless network based on the first bloom filter and the second bloom filter, or whether the MAC address is valid in the first wireless network and the second wireless network based on the first bloom filter and the second bloom filter.

In one instance, the MAC address validity message may further indicate a plurality of expired MAC addresses in the wireless network. The method 400 may further involve determining that the MAC address is invalid based on the plurality of expired MAC addresses in the MAC address validity message.

In another instance, the network device may be a wireless access point and the MAC address validity message may be broadcasted from another wireless access point and include the plurality of valid MAC addresses of client devices that are associated with the another wireless access point.

In one or more example embodiments, the MAC address validity message may indicate that the plurality of valid MAC addresses in the wireless network are available for use by the network device in a next time interval. The operation 404 of determining whether the MAC address is valid may further include determining that the MAC address is available for use in the next time interval based on the MAC address validity message.

In one form, the method 400 may involve encoding the MAC address for use by the network device in the next time interval based on determining that the MAC address is available. The MAC address validity message may indicate the plurality of valid MAC addresses available for the use in the probabilistic data structure.

In another form, the method 400 may further involve performing a MAC address rotation, at a preset time interval, in which a plurality of new MAC addresses are assigned to a plurality of network devices in the wireless network. The method 400 may further involve a management device of the wireless network generating the MAC address validity message that indicates the plurality of new MAC addresses in response to performing the MAC address rotation.

In one or more example embodiments, the MAC address validity message may further indicate the plurality of valid MAC addresses prior to performing the MAC address rotation.

In one instance, the method 400 may further involve generating the plurality of new MAC addresses using a hash value. The MAC address validity message may use the probabilistic data structure that includes a data set indicative of the plurality of new MAC addresses.

Figure 5:
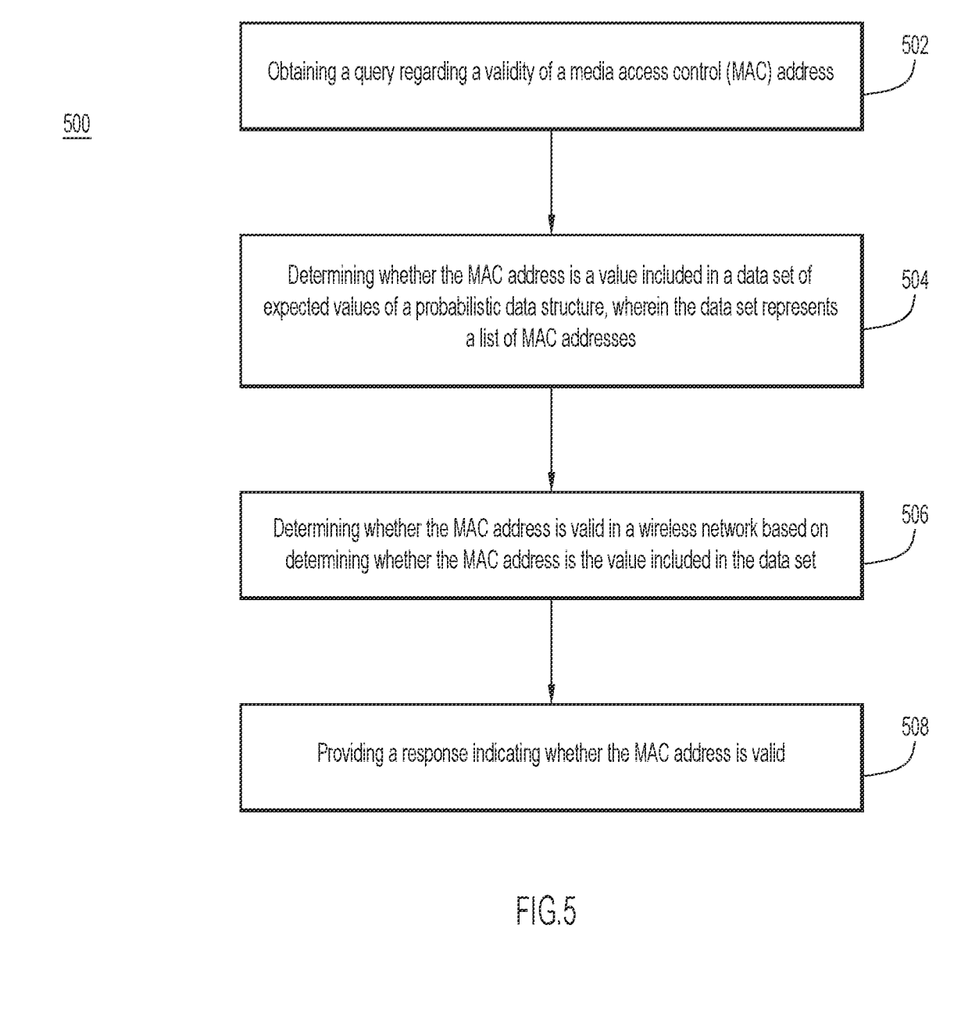
FIG. 5 is a flow diagram illustrating a method of providing a response that indicates whether the MAC address is valid, according to another example embodiment.

FIG. 5 is a flowchart illustrating a method of 500 of providing a response indicating whether a MAC address is valid, according to an example embodiment. The method 500 may be performed by a network device, such as one of the APs 120a-n shown in FIGS. 1 and 2, the AP 310 shown in FIG. 3A, or the network device 350 shown in FIGS. 3B and 3C.

The method 500 involves at 502, obtaining a query regarding a validity of a media access control (MAC) address.

The method 500 further involves at 504, determining whether the MAC address is a value included in a data set of expected values of a probabilistic data structure. The data set represents a list of MAC addresses.

The method 500 further involves at 506, determining whether the MAC address is valid in a wireless network based on determining whether the MAC address is the value included in the data set.

The method 500 further involves at 508, providing a response indicating whether the MAC address is valid.

In one or more example embodiments, the method 500 may further involve querying, at least one other network device in at least one other wireless network, about the validity of the MAC address in the at least one other wireless network.

In one instance, the probabilistic data structure may be a bloom filter.

Figure 6:
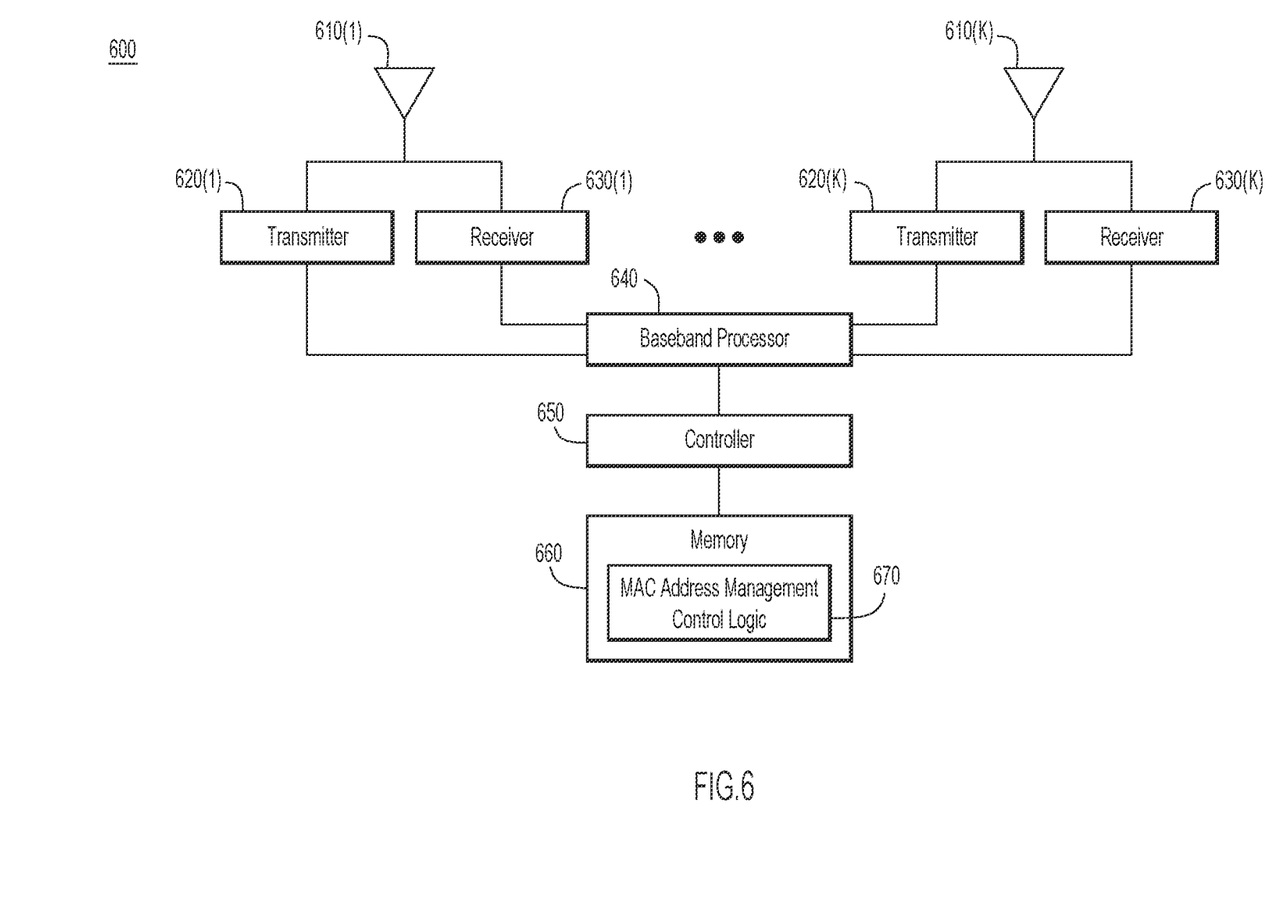
FIG. 6 is a hardware block diagram of a wireless access point configured to perform functions associated with operations discussed herein, according to various example embodiments.

Referring to FIG. 6, FIG. 6 illustrates a hardware block diagram of an access point or other similar device 600 that may perform functions associated with operations discussed herein in connection with the techniques depicted in FIGS. 1-5. In one specific example, device 600 may include one of the APs 120a-n shown in FIGS. 1 and 2, the AP 310 shown in FIG. 3A, or the network device 350 shown in FIGS. 3B and 3C.

Device 600 includes antennas 610(1)-610(K), transmitters 620(1)-620(K), receivers 630(1)-630(K), baseband processor (e.g., modem) 640, controller (e.g., hardware processor) 650, and memory 660. Each transmitter 620(1)-620(K) is connected to a corresponding one of antennas 610(1)-610(K), and likewise each receiver 630(1)-630(K) is connected to a corresponding one of antennas 610(1)-610(K). Baseband processor 640 may be implemented by fixed or programmable digital logic gates, such as in the form of an application specific integrated circuit (ASIC), or may be implemented by a dedicated digital signal processor, microprocessor or microcontroller. The baseband processor 640 may be configured to perform baseband signal processing associated with a relevant wireless communication protocol/technology, such as Wi-Fi wireless networking technology.

Controller 650 is coupled to baseband processor 640 and provides higher level control for device 600. Controller 650 may be a microprocessor or microcontroller. Memory 660 stores instructions that controller 650 executes to perform the control functions of the device 600. Among these functions are operations performed when controller 650 executes MAC address management control logic 670 stored in memory 660. In various embodiments, instructions associated with logic for device 600 can overlap in any manner and are not limited to the specific allocation of instructions and/or operations described herein.

In at least one embodiment, controller 650 may be at least one hardware processor configured to execute various tasks, operations and/or functions for device 600 as described herein according to software and/or instructions configured for device 600. Controller 650 can execute any type of instructions associated with data to achieve the operations detailed herein. In one example, controller 650 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory 660 is configured to store data, information, software, and/or instructions associated with device 600, and/or logic configured for memory 660. For example, any logic described herein (e.g., MAC address management control logic 670) can, in various embodiments, be stored for device 600 using memory 660.

In various embodiments, MAC address management control logic 670 can include instructions that, when executed, cause controller 650 to perform operations, which can include, but not be limited to, providing overall control operations of device 600; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., MAC address management control logic 670) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Figure 7:
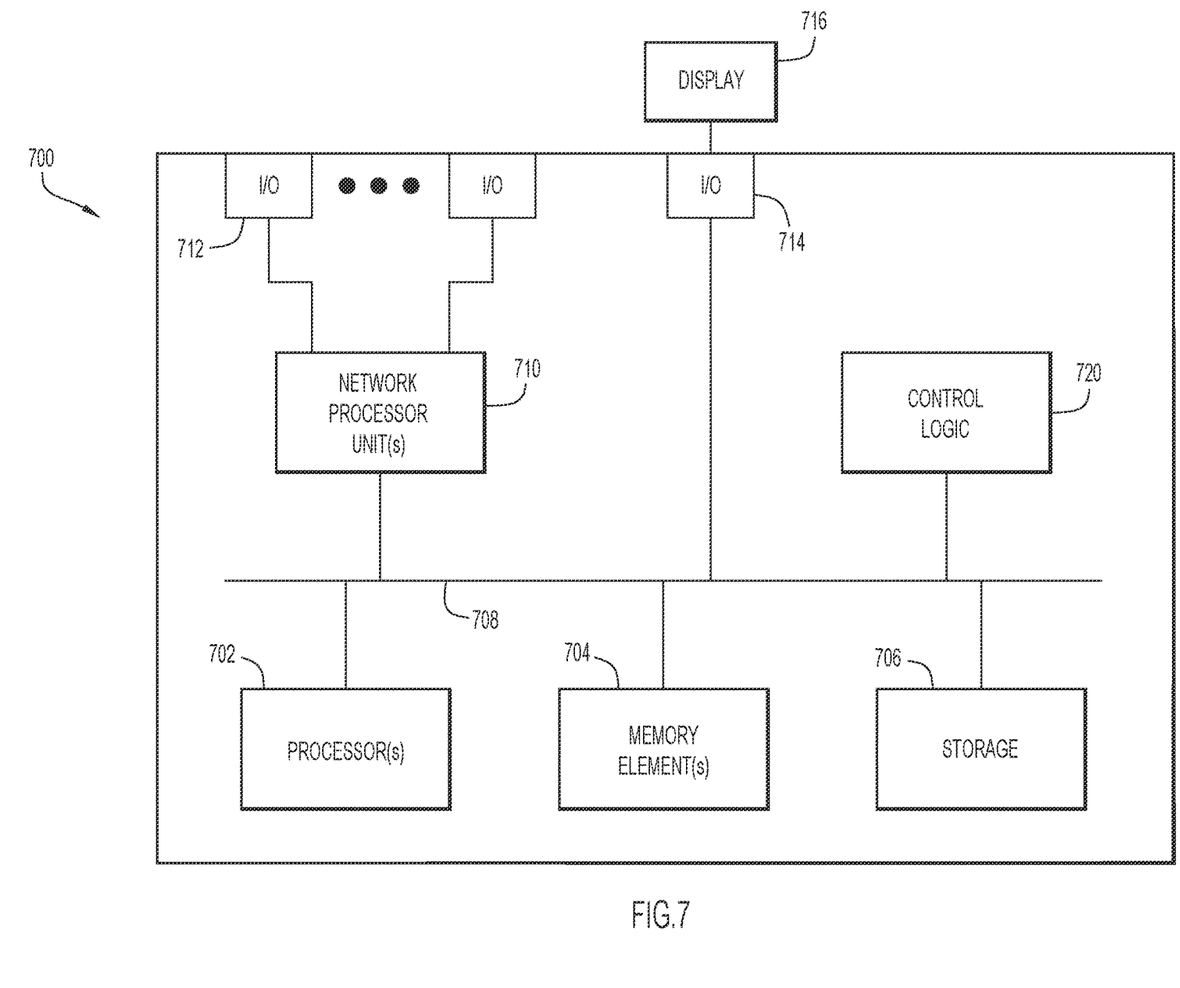
FIG. 7 is a hardware block diagram of a computing device that may perform functions associated with any combination of operations in connection with the techniques depicted and described in FIGS. 1-5, according to various example embodiments.

FIG. 7 is a hardware block diagram of a computing device 700 that may perform functions associated with any combination of operations in connection with the techniques depicted in FIGS. 1-5, according to various example embodiments, including, but not limited to, operations of the one or more client devices 130*a-m* or the management device/service 110 that are shown in FIGS. 1 and 2. Further, the computing device 700 may be representative of the two client devices 320*a* and 320*b* shown in FIGS. 3A-C or the network device 350 shown in FIGS. 3B and 3C. It should be appreciated that FIG. 7 provides only an illustration of one example embodiment and does not imply any limitations with regard to the environments in which different example embodiments may be implemented. Many modifications to the depicted environment may be made.

In at least one embodiment, computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with one or more memory elements 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 716, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a plurality of ports each configured to receive and send packets in a network and a processor. The processor is configured to perform various operations including obtaining, from one of the plurality of ports, a media access control (MAC) address validity message that indicates a plurality of valid MAC addresses in the network using a fully-exploded format or a probabilistic data structure. The operations further include determining whether a MAC address is valid based on the MAC address validity message.

In yet another example embodiment, an apparatus is provided. The apparatus includes a network interface configured to receive and send packets in a network and a processor. The processor is configured to perform various operations. The operations include obtaining, from the network interface, a query regarding a validity of a media access control (MAC) address. The operations further include determining whether the MAC address is a value included in a data set of expected values of a probabilistic data structure. The data set represents a list of MAC addresses. The operations further include determining whether the MAC address is valid in the wireless network based on determining whether the MAC address is the value included in the data set. The operations further include providing a response indicating whether the MAC address is valid.

In yet another example embodiment, one or more non-transitory computer readable storage media encoded with instructions are provided. When the media is executed by a processor, the instructions cause the processor to execute a method that includes obtaining a media access control (MAC) address validity message that indicates a plurality of valid MAC addresses in the wireless network using a fully-exploded format or a probabilistic data structure and determining whether a MAC address is valid based on the MAC address validity message.

In yet another example embodiment, one or more non-transitory computer readable storage media encoded with instructions are provided. When the media is executed by a processor, the instructions cause the processor to execute another method that involves obtaining a query regarding a validity of a media access control (MAC) address and determining whether the MAC address is a value included in a data set of expected values of a probabilistic data structure. The data set represents a list of MAC addresses. The method further involves determining whether the MAC address is valid in the wireless network based on determining whether the MAC address is the value included in the data set and providing a response indicating whether the MAC address is valid.

In yet another example embodiment, a system is provided that includes the devices and operations explained above with reference to FIGS. 1-7.

The programs described herein (e.g., control logic 720) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 706 and/or memory elements(s) 704 can store data, software, code, instructions (e.g., processor instructions), logic, parameters, combinations thereof, and/or the like used for operations described herein. This includes the storage 706 and/or memory elements(s) 704 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining, by a network device in a wireless network, a media access control (MAC) address validity message that indicates a plurality of valid MAC addresses in the wireless network using a fully-exploded format or a probabilistic data structure;
    determining, by the network device, whether a MAC address is valid based on the MAC address validity message; and
    changing an assigned MAC address of the network device to the MAC address based on determining that the MAC address is not valid.

2. The method of claim 1, wherein the MAC address validity message indicates the plurality of valid MAC addresses in the probabilistic data structure, and wherein determining whether the MAC address is valid includes:
    determining whether the MAC address is in a data set of expected values of the probabilistic data structure.

3. The method of claim 2, wherein the expected values in the data set are generated based on a hash value and the expected values are indicative of the plurality of valid MAC addresses that are associated with a service set identifier (SSID) of the wireless network.

4. The method of claim 1, wherein the MAC address validity message is a first MAC address validity message that includes a first bloom filter indicating a first set of valid MAC addresses in a first wireless network, and further comprising:
    obtaining, by the network device, a second MAC address validity message that includes a second bloom filter indicating a second set of valid MAC addresses in a second wireless network; and
    determining one or more of:
        whether the MAC address is valid in the first wireless network or the second wireless network based on the first bloom filter and the second bloom filter, or
        whether the MAC address is valid in the first wireless network and the second wireless network based on the first bloom filter and the second bloom filter.

5. The method of claim 1, wherein the MAC address validity message further indicates a plurality of expired MAC addresses in the wireless network, and further comprising:
    determining that the MAC address is invalid based on the plurality of expired MAC addresses in the MAC address validity message.

6. The method of claim 1, wherein the network device is a wireless access point and the MAC address validity message is broadcasted from another wireless access point and includes the plurality of valid MAC addresses of client devices that are associated with the another wireless access point.

7. A method comprising:
    obtaining, by a network device in a wireless network, a media access control (MAC) address validity message that indicates a plurality of valid MAC addresses in the wireless network using a fully-exploded format or a probabilistic data structure; and
    determining, by the network device, whether a MAC address is valid based on the MAC address validity message, wherein the MAC address validity message indicates that the plurality of valid MAC addresses in the wireless network are available for use by the network device in a next time interval, and wherein determining whether the MAC address is valid further includes determining that the MAC address is available for the use in the next time interval based on the MAC address validity message.

8. The method of claim 7, further comprising:
    encoding, by the network device, the MAC address for the use by the network device in the next time interval based on determining that the MAC address is available, wherein the MAC address validity message indicates the plurality of valid MAC addresses available for the use in the probabilistic data structure.

9. The method of claim 1, further comprising:
    performing a MAC address rotation, at a preset time interval, in which a plurality of new MAC addresses are assigned to a plurality of network devices in the wireless network; and
    generating, by a management device of the wireless network, the MAC address validity message that indicates the plurality of new MAC addresses in response to performing the MAC address rotation.

10. The method of claim 9, wherein the MAC address validity message further indicates the plurality of valid MAC addresses prior to performing the MAC address rotation.

11. The method of claim 9, wherein providing the MAC address validity message includes:
    broadcasting the MAC address validity message to one or more of a plurality of neighboring management devices and the plurality of network devices.

12. The method of claim 9, further comprising:
    generating the plurality of new MAC addresses using a hash value, wherein the MAC address validity message uses the probabilistic data structure that includes a data set indicative of the plurality of new MAC addresses.

13. An apparatus comprising:
    a network interface to receive and send packets in a network; and
    a processor, wherein the processor is configured to perform operations comprising:
        obtaining, from the network interface, a media access control (MAC) address validity message that indicates a plurality of valid MAC addresses in the network using a fully-exploded format or a probabilistic data structure;
        determining whether a MAC address is valid based on the MAC address validity message; and
        changing an assigned MAC address of the apparatus to the MAC address based on determining that the MAC address is not valid.

14. The apparatus of claim 13, wherein the MAC address validity message indicates the plurality of valid MAC address in the probabilistic data structure and wherein the processor is configured to determine whether the MAC address is valid by:
    determining whether the MAC address is in a data set of expected values of the probabilistic data structure.

15. The apparatus of claim 14, wherein the expected values in the data set are generated based on a hash value and the expected values are indicative of the plurality of valid MAC addresses that are associated with a service set identifier (SSID) of the network.

16. The method of claim 7, wherein the network device is a wireless access point and the MAC address validity message is broadcasted from another wireless access point and includes the plurality of valid MAC addresses of client devices that are associated with the another wireless access point.

17. The method of claim 7, wherein providing the MAC address validity message includes:
   broadcasting the MAC address validity message to one or more of a plurality of neighboring management devices.

18. The method of claim 1, wherein the MAC address validity message is generated in response to an address rotation.

19. The method of claim 1, wherein the MAC address validity message includes a first bloom filter indicating the plurality of valid MAC addresses in the wireless network for a given epoch.

20. The apparatus of claim 13, wherein the MAC address validity message includes a first bloom filter indicating the plurality of valid MAC addresses in the network for a given epoch.

* * * * *